US012732425B2

(12) United States Patent
Rajamanickam et al.

(10) Patent No.: US 12,732,425 B2
(45) Date of Patent: Sep. 8, 2026

(54) COORDINATING PACKET AND STATE EXTRACTION ACROSS DEVICES USING CONTROL/DATA PLANE SIGNALING

(71) Applicant: Cisco Technology, Inc., San Jose, CA (US)

(72) Inventors: Jaganbabu Rajamanickam, Kanata (CA); Madhan Sankaranarayanan, Chinnamanur (IN); David John Zacks, Vancouver (CA); Mark Ammar Rayes, Alamo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/789,251

(22) Filed: Jul. 30, 2024

(65) Prior Publication Data

US 2025/0260616 A1 Aug. 14, 2025

(30) Foreign Application Priority Data

Feb. 9, 2024 (IN) ............................. 202441008988

(51) Int. Cl.
*H04L 41/0816* (2022.01)
*H04L 43/08* (2022.01)

(52) U.S. Cl.
CPC .......... *H04L 41/0816* (2013.01); *H04L 43/08* (2013.01)

(58) Field of Classification Search
None
See application file for complete search history.

(56) References Cited

U.S. PATENT DOCUMENTS 11,665,079 B1 5/2023 Zacks et al.
2016/0182319 A1 6/2016 Martin et al.
2018/0367371 A1* 12/2018 Nagarajan ........... H04L 41/0866
2020/0145803 A1* 5/2020 Kodaypak ......... H04W 28/0247
2020/0186449 A1* 6/2020 Tofighbakhsh ......... H04L 43/04
2022/0131759 A1 4/2022 Boon
2022/0326757 A1* 10/2022 Sydir ................ H04W 52/0216
2022/0345417 A1* 10/2022 Kasichainula .......... H04L 47/30
2022/0353143 A1* 11/2022 Hill ....................... H04L 41/147
(Continued)

FOREIGN PATENT DOCUMENTS

EP 4434252 A1 * 11/2022 ........... H04W 24/02

OTHER PUBLICATIONS

Yi, et al. "A Control-Plane Perspective on Reducing Data Access Latency in LTE Networks", MobiCom '17: Proceedings of the 23rd Annual International Conference on Mobile Computing and Networking, Oct. 2017 , 14 pages.

*Primary Examiner* — Phyllis A Book
(74) *Attorney, Agent, or Firm* — Lee & Hayes, P.C.

(57) ABSTRACT

Techniques for capturing device state information from multiple network devices when a network error occurs are described. A network controller determines a trigger event and a trigger action. The trigger action is an action to be taken by a network device in response to the trigger event occurring, and the trigger event is an unexpected network event or network error. The network controller determines a method usable to configure the network devices to perform the trigger action in response to detecting the trigger event. The network controller configures, according to the method, the network devices to perform the trigger action in response to detecting the trigger event.

20 Claims, 6 Drawing Sheets

(56) References Cited

U.S. PATENT DOCUMENTS

| | | | | |
|---|---|---|---|---|
| 2022/0417117 | A1* | 12/2022 | Tayeb | H04L 41/28 |
| 2023/0041806 | A1 | 2/2023 | Singh | |
| 2023/0076025 | A1* | 3/2023 | Shaw | H04L 45/745 |
| 2023/0116748 | A1* | 4/2023 | Rowe | H04L 41/0663 709/224 |

* cited by examiner

| Trigger Event | Trigger Action |
| --- | --- |
| Event A | Action A |
| Event B | Actions B & C |
| ⋮ | ⋮ |
| Event N | Action N |

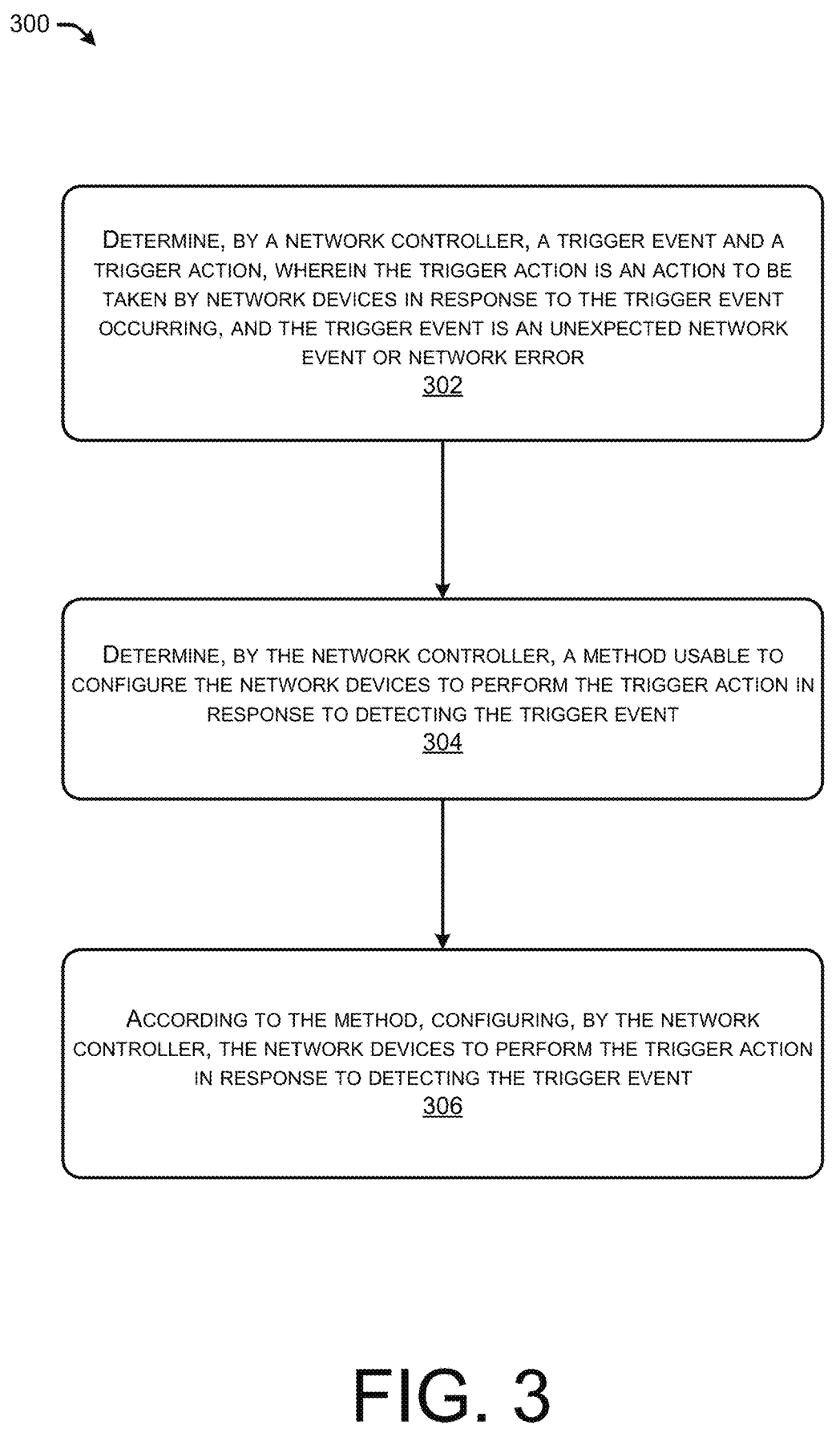

300

DETERMINE, BY A NETWORK CONTROLLER, A TRIGGER EVENT AND A TRIGGER ACTION, WHEREIN THE TRIGGER ACTION IS AN ACTION TO BE TAKEN BY NETWORK DEVICES IN RESPONSE TO THE TRIGGER EVENT OCCURRING, AND THE TRIGGER EVENT IS AN UNEXPECTED NETWORK EVENT OR NETWORK ERROR
302

DETERMINE, BY THE NETWORK CONTROLLER, A METHOD USABLE TO CONFIGURE THE NETWORK DEVICES TO PERFORM THE TRIGGER ACTION IN RESPONSE TO DETECTING THE TRIGGER EVENT
304

ACCORDING TO THE METHOD, CONFIGURING, BY THE NETWORK CONTROLLER, THE NETWORK DEVICES TO PERFORM THE TRIGGER ACTION IN RESPONSE TO DETECTING THE TRIGGER EVENT
306

FIG. 3

COORDINATING PACKET AND STATE EXTRACTION ACROSS DEVICES USING CONTROL/DATA PLANE SIGNALING

RELATED APPLICATIONS

This application claims priority to India Provisional Patent Application No. 202441008988, filed on Feb. 9, 2024; the entire contents of which are incorporated herein by reference.

TECHNICAL FIELD

The present disclosure relates generally to capturing network device state information during an unexpected network event or network error.

BACKGROUND

One of the keys and very basic requirements for efficient network operations is collecting the right, and relevant, network data at the appropriate time. Collecting the right data is not only crucial for network security purposes, but also simply for ensuring proper network functioning. Data collection can help enterprises reveal areas in a network where errors or slowdowns are frequently encountered. For example, data collection and triaging the problem is a major contributor for Mean Time To Repair (MTTR). Although data collection technologies are still evolving, in an empirical network environment, the cadence at which the data is being collected is still in seconds or sub-seconds. Thus, it is a very common scenario where a customer network is left with an issue intact to ensure that the required data that is relevant to the issue and essential for root cause analysis is being captured. The network may be left in a problematic condition to engage the right resources even though it may be apparent that an LC/node reload, or a link flap might solve the issue.

In some examples, Simple Network Management Protocol (SNMP) may be utilized to collect telemetry data from various network devices. However, collecting telemetry via SNMP can be a slow process, and due to its latency, it is not suitable for diagnosing intermittent issues by correlating them with triggering events on a remote node at the right time, as well as the right set of nodes. Simply put, when an unexpected event occurs on a remote node, SNMP may not be able to promptly gather data from the subset of affected nodes due to its inherent delays and lack of coordination capability. Additionally, although streaming telemetry can be useful, not all devices support streaming telemetry, and streamlining telemetry is a slow process of updating the operational states, and in the case of intermittent or transient problems the telemetry data across devices will not necessarily be useful to triage a specific issue. Thus, conventional techniques for determining a root cause of an unexpected network event or network error typically cost network enterprises excessive resources, both time and money, if a root cause can be determined at all.

Thus, there is a need for a mechanism designed to capture network device state information across a subset of affected network devices during a network error or unexpected network event without requiring the network to be left in an error state for an indeterminate amount of time.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 is a flow diagram illustrating an example method associated with the techniques described herein for capturing network device state information during an unexpected network event or network error.

DESCRIPTION OF EXAMPLE EMBODIMENTS OVERVIEW

Figure 1:
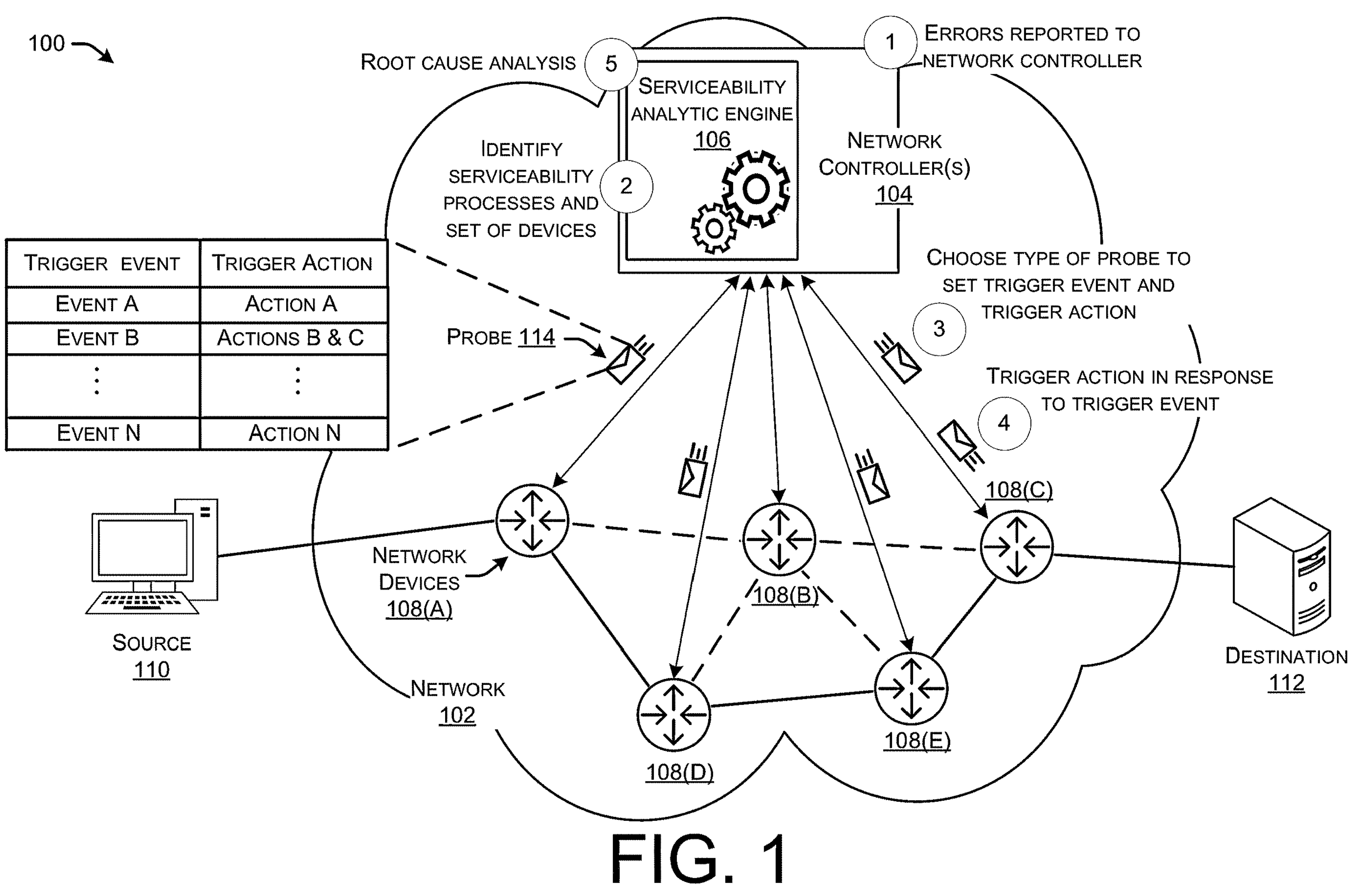
FIG. 1 illustrates an example environment that may implement various aspects of the technologies directed to capturing network device state information during an unexpected network event or network error.

This disclosure describes a method that includes determining, by a network controller, a trigger event and a trigger action, wherein the trigger action is an action to be taken by network devices in response to the trigger event occurring, and the trigger event is an unexpected network event or network error. The method may also include determining, by the network controller, a method usable to configure the network devices to perform the trigger action in response to detecting the trigger event. Finally, the method may include configuring, by the network controller and according to the method, the network devices to perform the trigger action in response to detecting the trigger event.

Additionally, the techniques described herein may be performed by a system and/or device having non-transitory computer-readable media storing computer-executable instructions that, when executed by one or more processors, performs the method described above.

Example Embodiments

As described above, in today's networking environments, it is critically important to collect the right and relevant network data at the appropriate time for ensuring proper network functioning and network security. However, conventional techniques for collecting data when an unexpected network event or network error occurs often leave a network with the issue intact to ensure that the required data, data that is relevant to the issue and essential for root cause analysis, is being captured. Otherwise, it is very difficult, if not impossible, to determine a root cause and appropriate remediation. Additionally, convention means of collecting data in response to an unexpected network event or network error can be a slow process, and due to its latency, it is not suitable for diagnosing intermittent issues by correlating them with triggering events on a remote node at the right time, as well as the right set of nodes. Furthermore, conventional means of collection data in response to an unexpected network event or network error do not provide for a dynamic domain wide coordination of packets and state extraction across a subset of devices in a network.

This disclosure is directed to techniques for coordinating packet and state extraction across network devices using control/data plane signaling. The techniques described here provide a mechanism by which data is propagated from network device to network device, causing the network devices to capture either a full device state or a subset of a device state and allowing the export of that state to an external service on-demand. By providing this mechanism across multiple network devices, the state of all or a subset of network devices along any given network path is captured. This can allow a network operator to review a snapshot of the state of all such network devices, in a coordinated manner, which is highly valuable for various purposes, such as end-to-end troubleshooting, network analytics, pre and post-upgrade processing, and network operator training. These techniques eliminate the need to leave a network in an error state to facilitate collecting the required device state information for root cause analysis. Essentially, the techniques described herein provide for a "snapshot" of the device state for a subset of network devices that are affected by a network error at the time the error occurs. This snapshot of device states can then be analyzed and used to troubleshoot the issue at a later time by a network operator, using various analysis tools, and without requiring that the network be left in an error state to capture the relevant data necessary for analysis.

To implement techniques described herein for a dynamic domain wide coordination of packets and state extraction across a subset of devices in a network, when an unexpected network event or network error occurs, the event or error is reported to a network controller. The network controller then identifies a serviceability process and a subset of devices that are affected by the unexpected network event or network error. The serviceability process defines the measure of and the set of the features that support the ease and speed of which corrective maintenance and preventive maintenance can be conducted on the network. The corrective maintenance includes all the actions taken to repair the failed network and get the network back into a properly operating state. The network controller also generates a serviceability-ID for each request to track the serviceability processing. A Serviceability Analytics Engine (SAE) of the network controller is leveraged to identify the serviceability processes and the subset of devices affected. The SAE determines optimal event triggers and trigger actions for the set of network devices involved in the serviceability process. The SAE may be an artificial intelligence (AI) and/or machine learning (ML) model that utilizes logical reasoning to determine a method of setting event triggers on the subset of devices that are involved in the unexpected network event or network error, and a trigger action to take when the trigger event occurs based on a specific serviceability process. A trigger action is an action to be taken by a network device in response to a trigger event (e.g., the unexpected network event or network error) occurring. Triggers for state capture may be periodic (time-based), episodic (based on observed trigger conditions), manually initiated under an operator controller, or any appropriate combination of periodic, episodic, or manual as determined by a network operator or other user. That is, a trigger action may be taken on a periodic basis (e.g., a device state snapshot every x amount of time), or exclusively when a trigger event (e.g., an unexpected network event or network error) occurs, of a combination of both periodic and event based.

The SAE may determine a method of setting event triggers and trigger actions on network devices. The method may be one of multiple types of probes, either single or multiple, that can set a trigger event on a network device and indicate the trigger action to take when the trigger event occurs. Several different types of probes may be utilized to configure a subset of network devices affected by an unexpected network event or network error to perform a trigger action in response to detecting a trigger event, a proprietary serviceability probe, an in-band control-plane serviceability probe, or a serviceability multicast domain probe for example. The proprietary serviceability probe, the in-band control-plane serviceability probe, and the serviceability multicast domain probe are examples of methods to set a trigger event and one or more trigger actions on network devices, and are not meant to be limiting, any other appropriate method for setting trigger events and trigger actions on a network device or subset of network devices in a domain may be used to implement the techniques describe herein.

A proprietary serviceability probe is a probe generated based on the trigger events and trigger actions according to the serviceability process and determined by the SAE. The proprietary serviceability probe is sent to the subset of devices involved in an unexpected network event of network error that has occurred. The proprietary serviceability probe can immediately collect device state information (or initiate some other trigger action) and/or dynamically configure the subset of network devices to perform the trigger action (e.g., take a snapshot of a device state) at a later time in response to detecting that the trigger event has occurred, such as an unexpected network event or network error. In some cases, a trigger event may trigger multiple trigger actions including generating another sequence of probes to be sent towards another targeted network device.

An in-band control-plane serviceability probe is a probe sent to an initial device that generates the initial control-plane packet, and the controller triggers the generation of the specific control-plane packet. For example, the controller may trigger the generation of the specific control-plane packet by clearing a specific prefix on that node. For example, if a BGP prefix has been added or deleted, the controller will trigger the generation of the packet. A new serviceability type length value (TLV) is embedded in the respective control-plane packets. For example, a BGP update packet will have the new serviceability TLV embedded in the packet. This TLV contains information that includes the trigger event and trigger action. In addition, the TLV may also include a time-interval, periodicity, filters such as a specific application/IP/Protocol/Ports, etc. The TLV is then carried to all the network devices that receive this control-plane packet. The network device that services this TLV will execute the trigger action when the network device's event matches the trigger criteria. For example, the serviceability TLV will be carried along with a BGP update packet from network device to network device. Note, although BGP is used herein as a control plane example, The techniques described herein are not limited to BPG and other control plane protocols to carry the required serviceability TLV may be used.

A new multicast group is designated for serviceability. In some examples, serviceability needs to be done on a whole domain. A serviceability multicast domain probe may be utilized in the cases where the serviceability needs to be done on a whole domain (e.g., check for recent vulnerability symptoms or used for network auditing, etc.). By implementing the new concept of a serviceability multicast domain, where a domain-specific multicast address is assigned to the network devices in the domain, the serviceability probe can be sent to all the network devices within the domain.

Additionally, to detect application or data-plane behavior/information, regular application data traffic may be embedded with additional information in the application data packets. This allows for tracking and matching responses based on the serviceability request. In this case, statistics may not be collected from network devices, however, the behavior responses on mid-nodes or end-nodes may be used to detect anomalies. This may be done by comparing the multiple responses to the same traffic or by matching them with the pre-defined expected responses. For example, in the case of SRv6, the concept of Micro-SIDs allows the intermediate nodes to alter the destination address. Tracing the path using time to live (TTL) increment and comparing the difference between the sent packet and the received internet control message protocol (ICMP) error packet can assist the network controller to infer the SID service behavior.

Trigger actions are actions to be taken by network devices in response to a trigger event occurring. The serviceability TLV embedded in the above-described probes contains information on the trigger actions that need to be executed in response to a trigger event occurring. In some instances, a trigger action may include the initiating node sending another trigger probe to a different subset of network devices with a diverse set of serviceability TLVs. The controller may either set the preconfigured probe in the trigger action or allow a network device to generate the trigger probe based on its own device state. In some examples, the trigger action may be to collect packets in the current buffer. For example, a trigger event may be "high-CPU" with a trigger action of "collect input packet buffer." If there is a DOS attack on the system causing high CPU usage, this can be identified by analyzing the packets in the buffer. In still another example, the trigger action may be to capture a total process memory snapshot, such that it can be re-instantiated in a lab environment and retrieve any information related to the control plane. This scenario may be used to triage any intermittent issues when it is not known what is needs to be collected at a time of a specific network event. The above-described trigger actions are exemplary and not meant to be limiting, any appropriate action(s) to assist in analysis and remediation of network devices may be executed in response to a trigger event occurring.

Once the necessary trigger action is taken in response to a trigger event, the information that is collected for the respective serviceability-ID is correlated with the logical reasoning engine in the SAE. If the analysis can infer any valid root cause a network operator may be informed about the findings. If the analysis cannot infer a root cause, a manual intervention may be requested. If a manual intervention is required, manual root cause information can be provided to the SAE for AI/ML model training.

In a first triaging use case an event signaling probe, used to signal the network devices about their trigger events and to perform the corresponding trigger actions may be sent from a network controller to the network devices. For example, a trigger event may be when a BGP update packet is received and processed for a specific prefix (e.g., x.x.x.x/24), perform the action of taking a snapshot of the device state, send the snapshot to the network controller and forward the BGP update packet with the specific prefix to a neighboring network device, the neighboring network device will in turn repeat the process. In a second triaging use case an event signaling probe, used to signal the network devices about their trigger events and to perform the corresponding trigger actions may be sent to the network devices, similar to the first use case. In this case, the trigger event may be when the packet (with probe ID 100) is forwarded on the backup path, perform the trigger action of collecting ingress and egress stats and send them to the network controller. In this example, an event trigger probe is used to trigger the action that was signaled before. For example, if the probe with the ID 100 is sent and the probe is taking the Fast Reroute (FRR) backup path then the ingress and egress stats are collected and sent to the network controller. However, if the probe with ID 100 is sent via a primary path, no action is taken. In other words, the trigger action, collect ingress and egress stats, is only taken when the trigger event, the probe is sent along the FRR backup path, occurs.

In still another use case example for chaos testing, an event signaling probe, used to signal the network devices about their trigger event and to perform the corresponding trigger actions may be sent to the network devices. In this case, the trigger event may be when the packet (with probe ID 100) is received, perform the action of forwarding the packet on the backup path. In this example, an event trigger probe is used to trigger the action that was signaled before. For example, the probe with the probe ID 100 is sent and if the probe is taking the FRR backup path then the ingress and egress stats are collected and sent to the network controller.

In the use cases described above, two types of probes are used, an event signaling probe and an event trigger probe. The event signaling probe is a probe used to signal the network devices about their trigger events and the trigger action to take in response to the trigger event occurring. The event triggering probe is a probe used to trigger the action that was signaled before with the event signaling probe.

FIG. 1 illustrates an example environment 100 that may implement various aspects of the technologies directed to dynamically coordinating packet and state extraction across network devices using control/data plane signaling. Environment 100 includes a network 102. For example, the network 102 may be a Software Defined Access (SDA) fabric architecture that facilitates data communication between a source connected to the network and a destination. Example environment 100 also includes a network controller 104 that provides centralized management for the network 102. The network controller 104 includes an integrated Serviceability Analytics Engine (SAE) 106. The SAE 106 may be an AI/ML model that utilizes logical reasoning to determine methods of setting triggers events and trigger actions on a set of network devices that are involved when an unexpected network event or network error occurs. Additionally, the SAE 106 may also analyze data associated with an unexpected network event or network error that is received by the network controller 104 from network devices 108, in order to determine a root cause. The network 102 may include multiple network devices that make up the network fabric, such as routers, switches, access points, gateways, etc. Environment 100 illustrates several network devices in the network 102, among them are network devices 108(A), 108(B), 108(C), 108(D), and 108(E). Environment 100 also includes a source 110 that may utilize the network 102 to send and receive communications to and from a destination 112. Finally, environment 100 includes one or more probes 114 sent from the SAE 106 of the network controller 104 to one or more network devices 108. The probes 114 may include information regarding trigger events and the associated trigger actions according to a serviceability process. Probe 114 may be a proprietary serviceability probe, an in-band control-plane serviceability probe, or a serviceability multicast domain probe for example. The probes 114 may be embedded with the new serviceability TLV that contains the information regarding trigger events and the associated trigger actions.

An example implementation process for coordinating packet and state extraction across network devices using control/data plane signaling is illustrated in FIG. 1. At (1) unexpected network events or network errors are reported to the network controller 104. The network controller 104 will generate a serviceability-ID to track the serviceability processing for the unexpected network event or network error. At (2) the SAE 106 of the network controller 104 identifies the appropriate serviceability processes and the set of network devices 108 involved with the network error. For example, in FIG. 1 the source 110 is sending a communication to destination 112 over network 102. The flow of data packets is routed through network devices 108(A), 108(D), 108(E), and 108(C) on the path to destination 112 as shown. Thus, if the network controller 104 receives a report of an error involving the flow of data packets along this path, the SAE 106 identifies network devices 108(A), 108(D), 108(E), and 108(C) as the subset of network devices that are associated with the reported network error.

At (3) a method usable to configure the network devices 108 to perform a trigger action in response to detecting a trigger event is determined. The trigger action is an action to be taken by the network devices 108 in response to the trigger event occurring, and the trigger event is the unexpected network event or network error. As illustrated in FIG. 1, the method usable to configure the network devices 108 to perform the trigger action in response to detecting the trigger event is probe 114. Probe 114 is transmitted to each of the network devices 108 (network devices 108(A), 108(D), 108(E), and 108(C)) associated with the trigger event. Probe 114 contains information including a trigger action to take in response to a trigger event occurring. For example, probe 114 may be embedded with a serviceability TLV that contains information that includes the trigger event and trigger action. In addition, the TLV may also include a time-interval, periodicity, filters such as a specific application/IP/Protocol/Ports, etc. The TLV is then carried to all the network devices that receive this control-plane packet. The network device that services this TLV will execute the trigger action when the network device's event matches the trigger criteria. For example, the serviceability TLV will be carried along with a BGP update packet from network device to network device. In some examples the SAE 106 may send the probe 114 to the network devices 108 when an unexpected network event or network error is reported. Alternately or in addition, the SAE 106 may transmit probe 114 to all or a subset of network devices 108 prior to receiving a report of an unexpected network event or network error, and the network devices 108 may be configured to take the trigger action at a later time when a trigger event is detected. In some examples, probe 114 may contain information associated with a single trigger event and a single trigger action to take when the trigger event is detected. In other instances, the probe 114 may configure a network device to take more than one action in response to a trigger event. For example, when a trigger event is detected by a network device 108, a first trigger action may be to take a device state snapshot and send it to the network controller 104 such that the SAE 106 can use the device state snapshot for root cause analysis, and a second action may be to generate another probe to send to one or more other network devices. In some examples, a probe 114 may include multiple trigger events and the corresponding one or more trigger actions to take in response to each trigger event.

At (4) when a trigger event (e.g., an unexpected network event or network error) occurs, the network device(s) 108 execute the trigger action as determined by the SAE 106 and configured via probe 114. As described above, a trigger event may prompt one or more trigger actions to be taken by the network devices 108. For example, a total process memory snapshot may be taken by a network device 108 and sent to the SAE 106 of the network controller 104 for root cause analysis. In some examples, an operating system snapshot may be used to re-instantiate the software in a lab environment such that any relevant information related to the control plane may be retrieved. Alternately or in addition, packets in a current buffer may be collected. For example, if a trigger event is high CPU usage (e.g., above a predetermined threshold), a trigger action may be to collect the input packet buffer and send it to the network controller 104 such that the SAE 106 can analyze the collected packets. By analyzing the collected packets, issues like a DOS attack on the system may be identified. Alternately or in addition, a trigger action may trigger the initiating node to send another trigger probe to a different set of devices with a diverse set of serviceability TLVs. The network controller 104 may set the preconfigured probe in the trigger action, or allow the network device 108 to generate the new probe based on its own device state. Note, these actions are exemplary and not meant to be limiting, any one or more appropriate trigger actions may be taken for any given unexpected network event or network error identified as a trigger event by the SAE 106.

At (5) information acquired due to the trigger action (e.g., network device state snapshot, collected packets, etc.) may be used to conduct a root cause analysis. Once the information is collected for the respective serviceability-ID, the collected information may be correlated with the logical reasoning engine of the SAE 106. If a valid root cause can be determined by the analysis of the SAE 106, a network operator or other appropriate user may be informed of the findings in addition to action taken to remediate the cause of the unexpected network event or network error. Alternately, if the SAE analysis cannot infer a root cause, manual intervention for root cause analysis may be required. In such cases, when a root cause is determined manually, the manual root cause information may be provided to the SAE in order to automatically train the AI/ML model.

Figure 2:
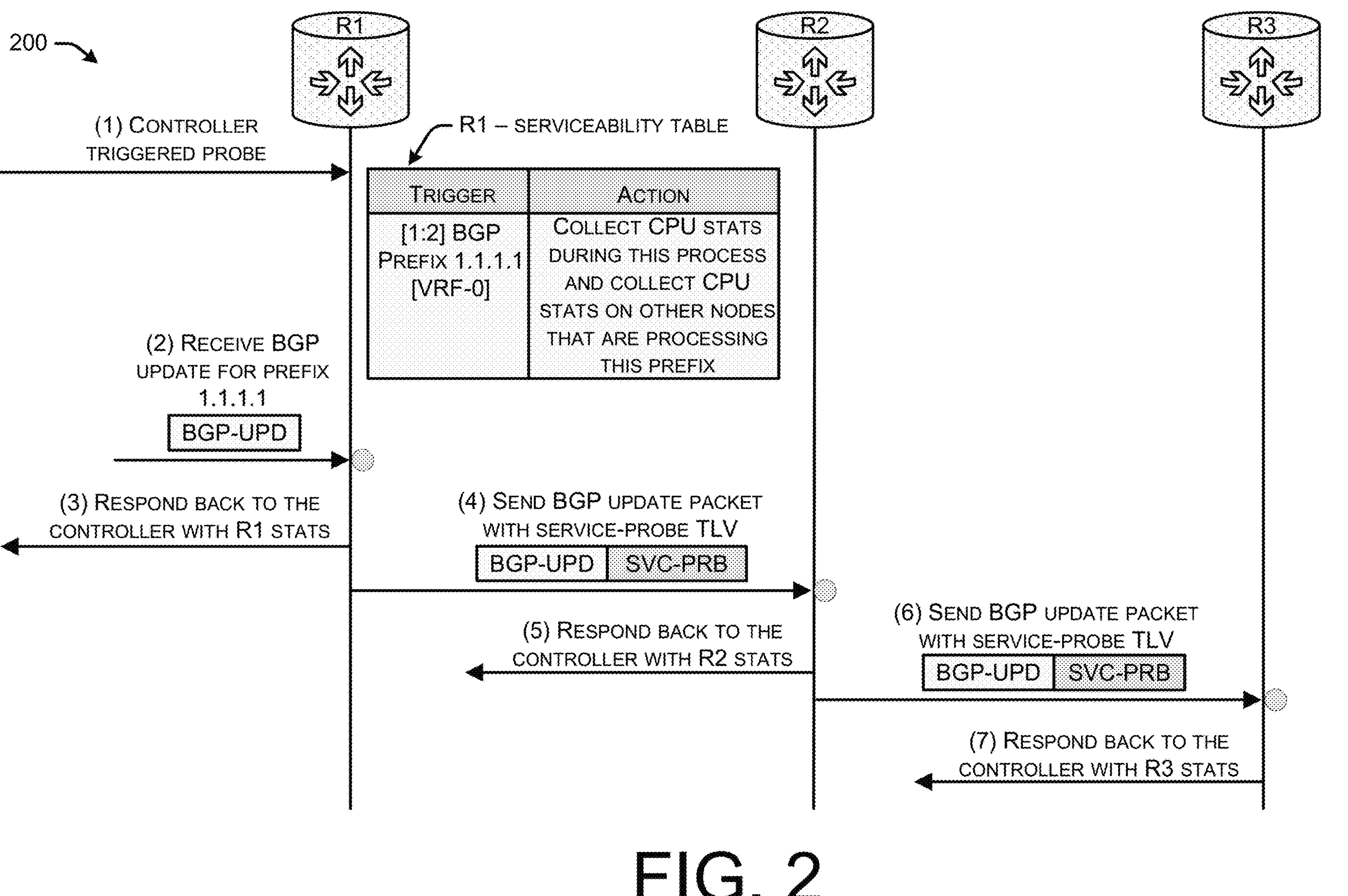
FIG. 2 illustrates an example of a serviceability probe embedded in a control plane packet.

FIG. 2 illustrates an example 200 of a serviceability probe embedded in the control plane. In example 200 at (1) a serviceability probe with ID [1:2] (<source-id>: <probe-id>) is sent to a network device, R1, by a network controller. For example, with reference to FIG. 1 the network controller 104 may send probe 114 to network device 108(A). The probe may be embedded with the new serviceability TLV that contain information including a trigger event and a trigger action. The trigger action is an action for the R1 to take in response to the trigger event occurring. In the example 200, the trigger event is receiving a BGP update for prefix 1.1.1.1 and the trigger action is to collect CPU stats for R1 and other nodes that are also processing the prefix 1.1.1.1 and send them to the network controller. At (2) when R1 receives the BGP update for prefix 1.1.1.1, R1 collects the CPU stats during this process and at (3) sends them back to the controller. In addition, at (4) R1 sends the BGP update packet with the serviceability probe TLV embedded in the BGP update packet to its neighbor, R2. When R2 receives the BGP update packet with prefix 1.1.1.1, R2 collects its CPU stats and at (5) responds back to the controller with the R2 CPU stats. In addition, at (6) R2 sends the BGP update with the serviceability probe TLV embedded in the BGP update packet to R3. When R3 receives the BGP update packet with prefix 1.1.1.1, R3 collects the CPU stats and at (7) respond back to the controller with the R3 CPU stats. Note, example 200 is not meant to be limiting, in any given situation, more or less network devices may make up a subset of network devices that are affected by an unexpected network event or network error and are triggered to execute the trigger action(s) described.

FIG. 3 is a flow diagram illustrating an example method 300 associated with the techniques described herein for configuring network devices to take an action, such as a snapshot capture of the devices state, in response to a trigger event such as an unexpected network event or network error. Example method 300 illustrates aspects of the functions performed by the network controller 104 as described with reference to FIG. 1. The logical operations described herein with respect to FIG. 3 may be implemented (1) as a sequence of computer-implemented acts or program modules running on a computing system and/or (2) as interconnected machine logic circuits or circuit modules within the computing system. In some examples, the method(s) 300 may be performed by a system comprising one or more processors and one or more non-transitory computer-readable media storing computer-executable instructions that, when executed by the one or more processors, cause the one or more processors to perform the method(s) 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302 a network controller determines a trigger event and a trigger action. The trigger action is an action to be taken by a network device in response to the trigger event occurring and the trigger event is an unexpected network event or network error. For example, with reference to FIG. 1 the SAE 106 of the network controller 104 may determine a trigger event and one or more trigger actions to take when the trigger event occurs. The SAE 106 may determine the trigger event and one or more trigger actions to execute in response to the trigger event occurring based on a serviceability process.

At operation 304 the network controller determines a method usable to configure the network devices to perform the trigger action in response to detecting the trigger event. For example, with reference to FIG. 1 the method to configure the network devices to perform the trigger action in response to detecting the trigger event is probe 114. Probe 114 may be a proprietary serviceability probe, an in-band control-plane serviceability probe, or a serviceability multicast domain probe, or any other appropriate method of configuring a network device to perform the trigger action in response to detecting the trigger event. Probe 114 may be embedded with new serviceability TLV that contains information including the trigger event and the one more trigger actions to take in response to the trigger event occurring. For example, with reference to FIG. 2, the trigger event is receiving a BGP update for prefix 1.1.1.1 and the trigger actions are to collect CPU stats for the network device and other nodes that are also processing the prefix 1.1.1.1 and send them to the network controller and to sends the BGP update packet with the serviceability probe TLV embedded in the BGP update packet to a neighboring network device.

At operation 306 according to the method determined at operation 304, the network controller configures the network devices to perform the trigger action in response to detecting the trigger event. For example, with reference to FIG. 1 the network controller 104 sends probe 114 to network devices 108, configuring them to take one or more trigger actions in response to a trigger event. As illustrated in environment 100, when event A occurs, the network devices 108 are configured to perform action A. When event B occurs, the network devices are configured to perform actions B and C. With reference to FIG. 2, at (1) the network controller configures network device, R1, to collect CPU stats when a BGP update packet with prefix 1.1.1.1 is received, and also to forward the BGP update packet embedded with the serviceability TLV to R1.

Figure 4:
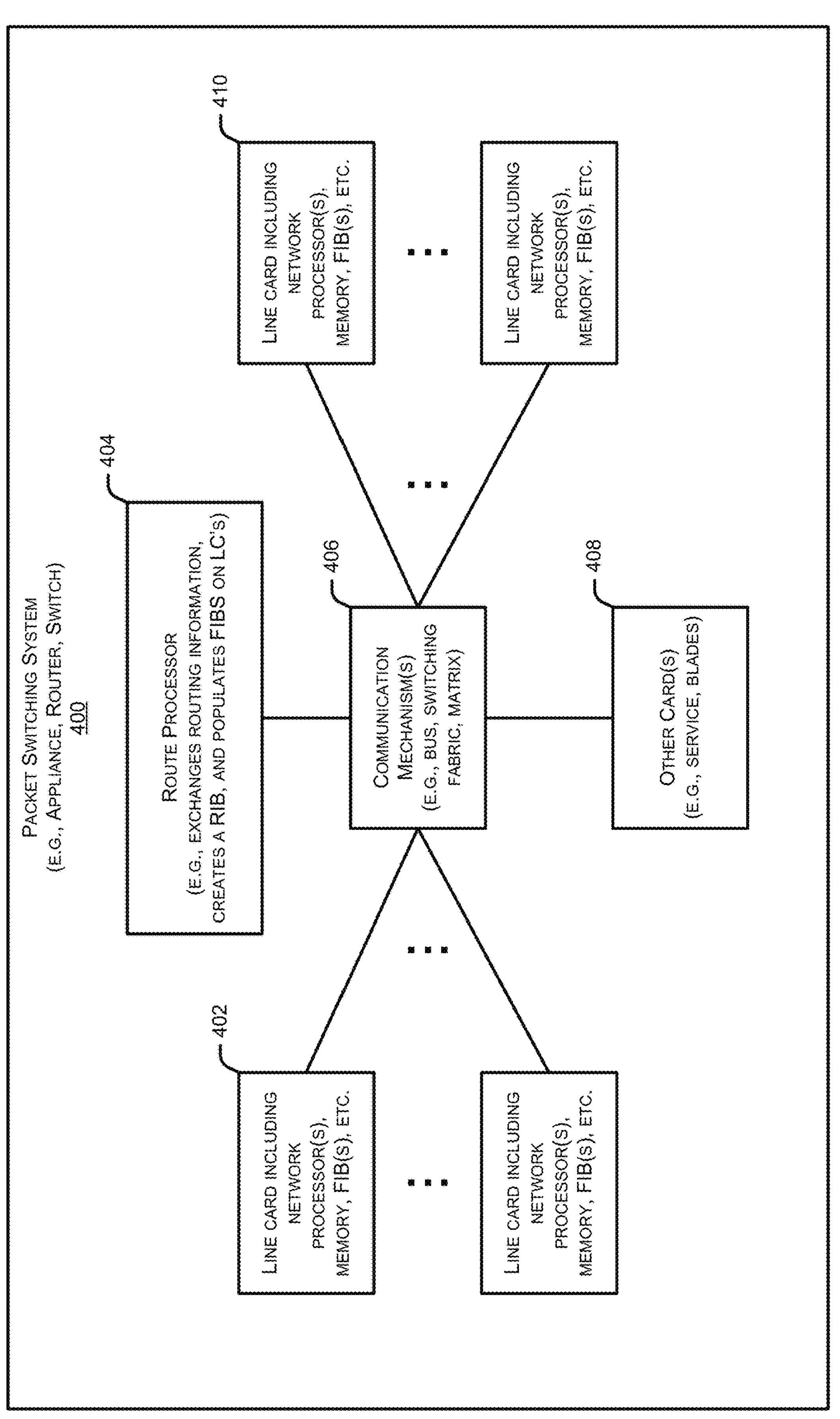
FIG. 4 illustrates a block diagram illustrating an example packet switching system that can be utilized to implement various aspects of the technologies disclosed herein.

FIG. 4 illustrates a block diagram illustrating an example packet switching device (or system) 400 that can be utilized to implement various aspects of the technologies disclosed herein. In some examples, packet switching device(s) 400 may be employed in various networks, such as, for example, network devices 108 described with respect to FIG. 1.

In some examples, a packet switching device 400 may comprise multiple line card(s) 402, 410, each with one or more network interfaces for sending and receiving packets over communications links (e.g., possibly part of a link aggregation group). The packet switching device 400 may also have a control plane with one or more processing elements for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may comprise hardware-based communication mechanism 406 (e.g., bus, switching fabric, and/or matrix, etc.) for allowing its different entities, line cards 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching device 400.

Figure 5:
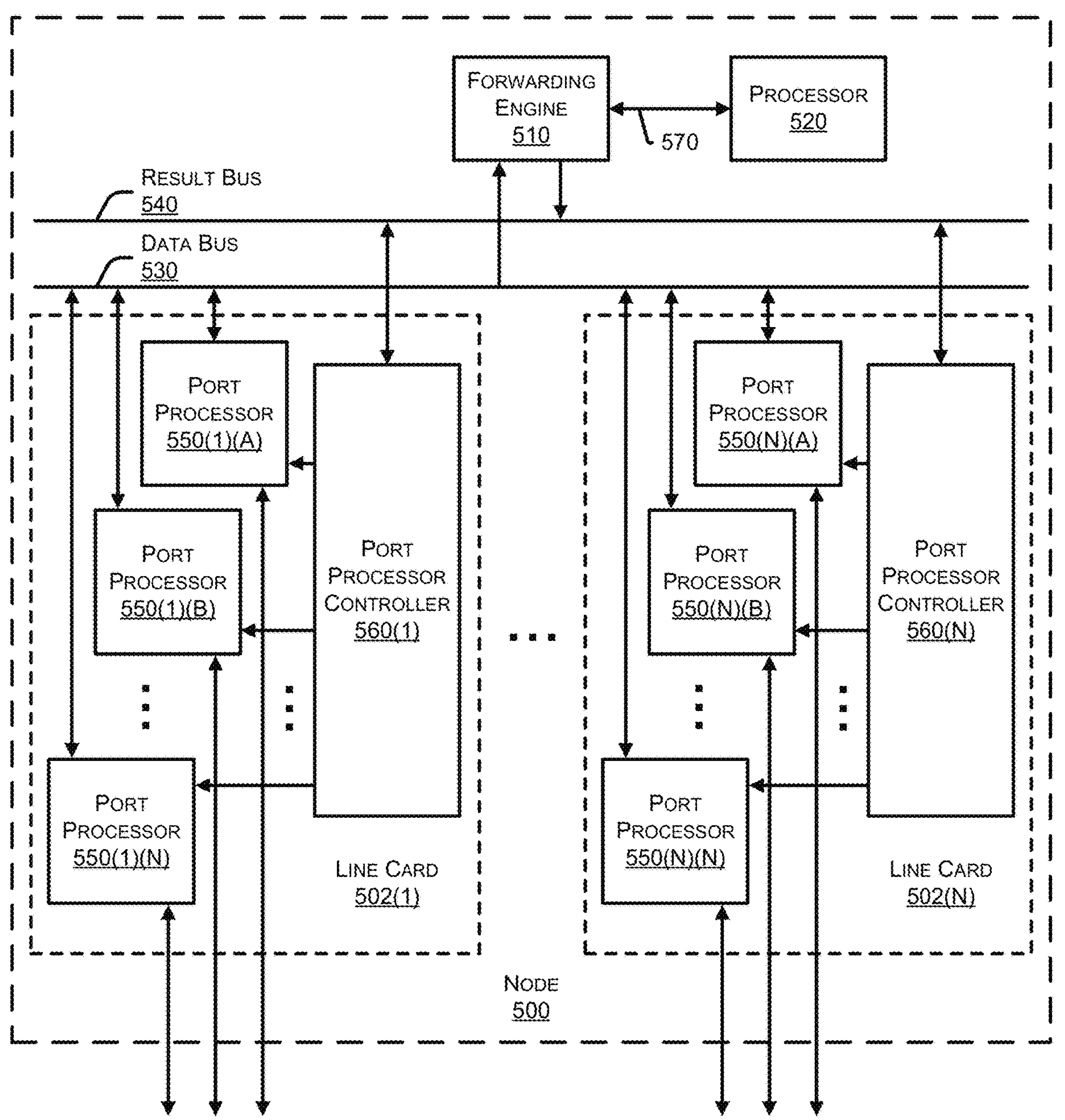
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be network devices such as network devices 108 employed in various networks, such as, for example the network 102 as described with respect to FIG. 1.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor (s) 550(1)(A)-(N)(N) at which the packet or packet and header was received and to one or more of those devices coupled to the data bus 530 (e.g., others of the port processor (s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560(1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or may add packet security information in order to secure the packet. On a node 500 sourcing such a packet or packet and header, this processing may include, for example, encryption of some or all of the packets or packet and header's information, the addition of a digital signature, and/or some other information and/or processing capable of securing the packet or packet and header. On a node 500 receiving such a processed packet or packet and header, the corresponding process may be performed to recover or validate the packets or packet and header's information that has been secured.

Figure 6:
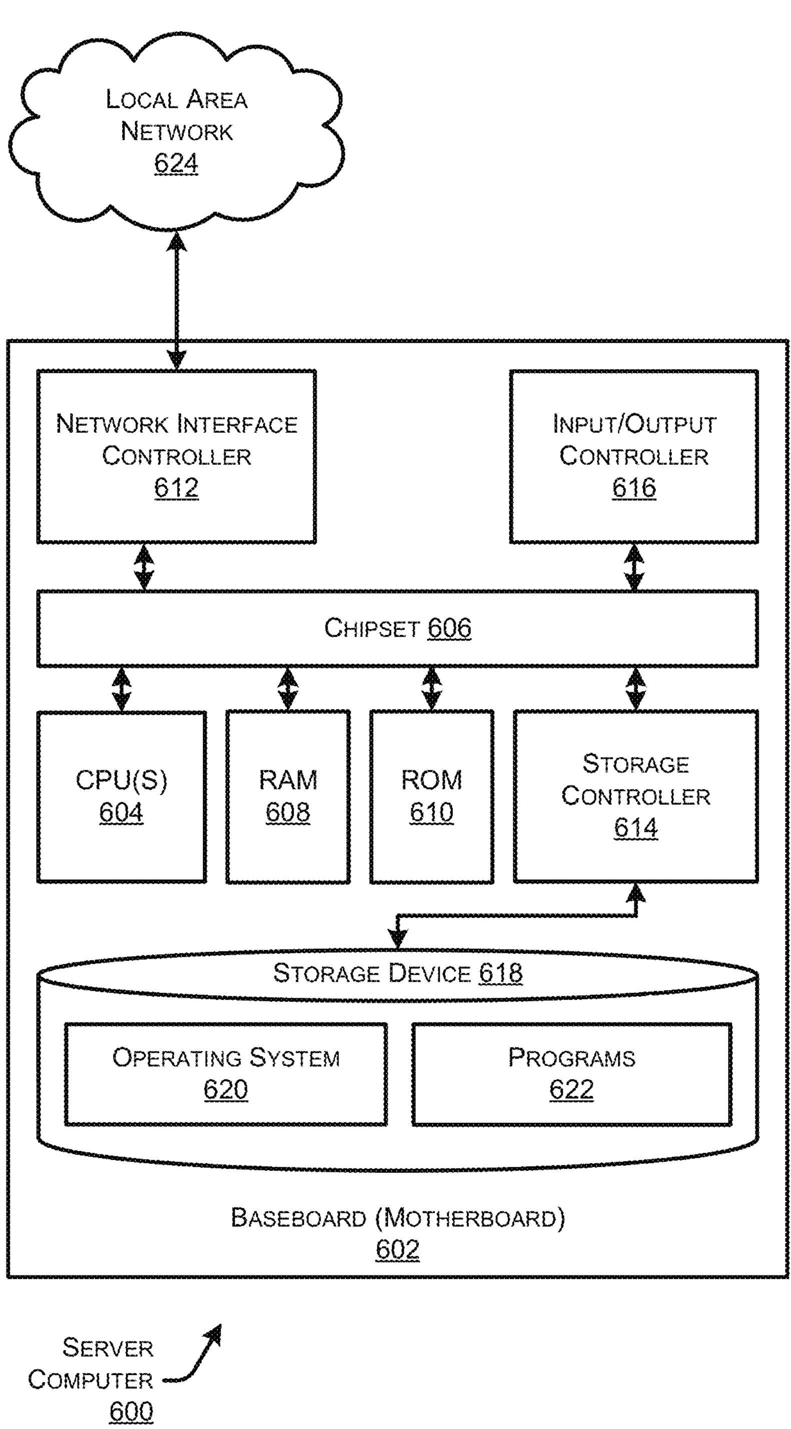
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to a network device such as the network controller 104 or network devices 108, the packet switching system 400, and/or the node 500 described herein with respect to FIGS. 1, 4 and 5, respectively.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 624. Network 624 may, in some examples, correspond to the network 102 of FIG. 1. The chipset 606 can include functionality for providing network connectivity through a NIC 612, such as a gigabit Ethernet adapter. The NIC 612 is capable of connecting the computing device 600 to other computing devices over the network 624. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the network controller 104, the network devices 108, and/or any components included therein, may be supported by one or more devices similar to computing device 600. Stated otherwise, some or all of the operations performed by the network controller 104, the network devices 108, or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIG. 6. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

determining, by a network controller, a trigger event and a trigger action, wherein the trigger action is an action to be taken by network devices in response to the trigger event occurring, and the trigger event is an unexpected network event or network error;

determining, by a Serviceability Analytics Engine (SAE) associated with the network controller, a method usable to configure the network devices to perform the trigger action in response to detecting the trigger event, wherein the SAE is a machine learning (ML) model; and according to the method, configuring, by the network controller, the network devices to perform the trigger action in response to detecting the trigger event.

2. The method of claim 1, wherein the trigger event is an unexpected network event and further comprising:

receiving, by the network controller, a report of the unexpected network event;

identifying, by the network controller, a serviceability process for the unexpected network event and a subset of network devices associated with the unexpected network event, wherein the serviceability process includes the action to be taken by the subset of network devices in response to the unexpected network event; and configuring, by the network controller, the subset of network devices to perform the trigger action in response to the unexpected network event.

3. The method of claim 1, wherein the method is a proprietary serviceability probe that configures the network devices to (i) collect device state information when the proprietary serviceability probe is received (ii) collect device state information in response to detecting the trigger event.

4. The method of claim 1, wherein the method is an in-band control-plane serviceability probe that configures an initial network device that generates an initial control-plane packet to perform the trigger action in response to detecting the trigger event, and wherein a serviceability type length value (TLV) is embedded in respective control-plane packets, and wherein the serviceability TL V includes the trigger event and the trigger action.

5. The method of claim 1, wherein the method is a serviceability multicast domain probe transmitted to a subset of network devices that have a domain-specific multicast address assigned.

6. The method of claim 1, wherein the trigger action comprises collecting network device state information during the unexpected network event network error and transmitting the network device state information to the network controller for root cause analysis.

7. The method of claim 1, wherein the trigger action comprises one or more of collecting an input packet buffer, capturing a process memory snapshot, or generating a trigger probe to send to one or more second network devices.

8. A system comprising:

one or more processors; and one or more computer-readable media storing computer-executable instructions that, when executed by the one or more processors, cause the one or more processors to perform operations comprising:

determining, by a network controller, a trigger event and a trigger action, wherein the trigger action is an action to be taken by network devices in response to the trigger event occurring, and the trigger event is an unexpected network event or network error;

determining, by a Serviceability Analytics Engine (SAE) associated with the network controller, a method usable to configure the network devices to perform the trigger action in response to detecting the trigger event, wherein the SAE is a machine learning (ML) model; and according to the method, configuring, by the network controller, the network devices to perform the trigger action in response to detecting the trigger event.

9. The system of claim 8, wherein the trigger event is an unexpected network event and further comprising:

receiving, by the network controller, a report of the unexpected network event;

identifying, by the network controller, a serviceability process for the unexpected network event and a subset of network devices associated with the unexpected network event, wherein the serviceability process includes the action to be taken by the subset of network devices in response to the unexpected network event; and configuring, by the network controller, the subset of network devices to perform the trigger action in response to the unexpected network event.

10. The system of claim 8, wherein the method is a proprietary serviceability probe that configures the network devices to (i) collect device state information when the proprietary serviceability probe is received (ii) collect device state information in response to detecting the trigger event.

11. The system of claim 8, wherein the method is an in-band control-plane serviceability probe that configures an initial network device that generates an initial control-plane packet to perform the trigger action in response to detecting the trigger event, and wherein a serviceability type length value (TLV) is embedded in respective control-plane packets, and wherein the serviceability TLV includes the trigger event and the trigger action.

12. The system of claim 8, wherein the method is a serviceability multicast domain probe transmitted to a subset of network devices that have a domain-specific multicast address assigned.

13. The system of claim 8, wherein the trigger action comprises collecting network device state information during the unexpected network event network error and transmitting the network device state information to the network controller for root cause analysis.

14. The system of claim 8, wherein the trigger action comprises one or more of collecting an input packet buffer, capturing a process memory snapshot, or generating a trigger probe to send to one or more second network devices.

15. One or more non-transitory computer-readable media storing instructions that, when executed, cause one or more processors to perform operations comprising:

determining, by a network controller, a trigger event and a trigger action, wherein the trigger action is an action to be taken by network devices in response to the trigger event occurring, and the trigger event is an unexpected network event or network error;

determining, by a Serviceability Analytics Engine (SAE) associated with the network controller, a method usable to configure the network devices to perform the trigger action in response to detecting the trigger event, wherein the SAE is a machine learning (ML) model; and according to the method, configuring, by the network controller, the network devices to perform the trigger action in response to detecting the trigger event.

16. The one or more non-transitory computer-readable media of claim 15, wherein the trigger event is an unexpected network event and further comprising:

receiving, by the network controller, a report of the unexpected network event;

identifying, by the network controller, a serviceability process for the unexpected network event and a subset of network devices associated with the unexpected network event, wherein the serviceability process includes the action to be taken by the subset of network devices in response to the unexpected network event; and configuring, by the network controller, the subset of network devices to perform the trigger action in response to the unexpected network event.

17. The one or more non-transitory computer-readable media of claim 15, wherein the method is a proprietary serviceability probe that configures the network devices to (i) collect device state information when the proprietary serviceability probe is received (ii) collect device state information in response to detecting the trigger event.

18. The one or more non-transitory computer-readable media of claim 15, wherein the method is an in-band control-plane serviceability probe that configures an initial network device that generates an initial control-plane packet to perform the trigger action in response to detecting the trigger event, and wherein a serviceability type length value (TLV) is embedded in respective control-plane packets, and wherein the serviceability TLV includes the trigger event and the trigger action.

19. The one or more non-transitory computer-readable media of claim 15, wherein the method is a serviceability multicast domain probe transmitted to a subset of network devices that have a domain-specific multicast address assigned.

20. The one or more non-transitory computer-readable media of claim 15, wherein the trigger action comprises one or more of collecting an input packet buffer, capturing a process memory snapshot, or generating a trigger probe to send to one or more second network devices.

* * * * *